United States Patent [19]

Couvillion et al.

[11] 4,411,439
[45] Oct. 25, 1983

[54] SEALING MEMBER WITH ANTI-EXTRUSION MEANS AND PROTECTIVE COATING

[75] Inventors: Paul L. Couvillion; James E. Ray, both of Houston, Tex.

[73] Assignee: Jim Ray Company, Inc., Houston, Tex.

[21] Appl. No.: 372,487

[22] Filed: Apr. 28, 1982

[51] Int. Cl.³ .................. F16J 15/18; F16J 15/46
[52] U.S. Cl. .................. 277/188 A; 277/27; 277/32; 277/152
[58] Field of Search .............. 277/188 R, 188 A, 152, 277/153, 165, 1, 3, 27, 135, 138, 237, 117, 189, 12, 32

[56] References Cited

U.S. PATENT DOCUMENTS

| | | | |
|---|---|---|---|
| 2,330,197 | 9/1943 | Allen et al. | 277/188 A X |
| 2,509,151 | 5/1950 | Kasten . | |
| 2,509,436 | 5/1950 | Isenbarger . | |
| 2,808,301 | 10/1957 | Bowerman | 277/188 R X |
| 2,867,457 | 6/1959 | Riesing et al. . | |
| 2,905,489 | 9/1959 | Thompson et al. | 277/188 R X |
| 2,930,608 | 3/1960 | Hogan et al. | 277/27 UX |
| 2,968,498 | 1/1961 | Saunders | 277/189 X |
| 3,011,803 | 12/1961 | Buckner et al. | 277/188 R X |
| 3,172,670 | 3/1965 | Pras | 277/188 R X |
| 3,218,087 | 11/1965 | Hallesy | 277/188 R X |
| 3,306,620 | 2/1967 | Taschenberg | 277/188 R X |
| 3,334,549 | 8/1967 | Sheldon | 277/188 R X |
| 3,388,913 | 6/1968 | Tracy | 277/32 |
| 3,718,338 | 2/1973 | Traub | 277/188 R X |
| 3,970,321 | 7/1976 | Dechavanne | 277/188 A |
| 4,053,166 | 10/1977 | Domkowski | 277/152 |
| 4,201,392 | 5/1980 | Watts | 277/165 |

FOREIGN PATENT DOCUMENTS

| | | | |
|---|---|---|---|
| 506965 | 11/1954 | Canada | 277/188 A |
| 466334 | 10/1951 | Italy | 277/188 R |
| 391405 | 9/1965 | Switzerland | 277/188 R |
| 710374 | 6/1954 | United Kingdom | 277/188 R |
| 797684 | 7/1958 | United Kingdom | 277/188 A |

*Primary Examiner*—Robert S. Ward, Jr.
*Attorney, Agent, or Firm*—Pravel, Gambrell, Hewitt, Kirk & Kimball

[57] ABSTRACT

A sealing member for sealing between a member movable relative to a body or housing. An elastomeric material is mounted in a space formed between the movable member and the housing. The elastomer serves as an initial primary seal at lower pressure differentials, while structure is provided with the sealing member to inhibit elastomer creep or extrusion at increased pressures.

10 Claims, 4 Drawing Figures

SEALING MEMBER WITH ANTI-EXTRUSION MEANS AND PROTECTIVE COATING

BACKGROUND OF INVENTION

1. Field of Invention

The present invention relates to sealing members.

2. Description of Prior Art

Prior patents, such as U.S. Pat. No. 3,970,321 have been directed to forming a seal in an annulus between a longitudinally movable shaft and a housing containing the shaft. The structure described in this patent included a two piece elastomer member including a cup packing and a pressure distributing ring. An end extension ring was formed on a front face of the cup packing to assist in prevention of extrusion of the elastomer member. However, an annular gap was present between the cup packing inner surface and the shaft behind the extrusion ring. Since the cup packing was structured to bend inwardly along the inner surface into increased contact with the shaft as pressure increased, the possibility of elastomer extrusion past the extrusion line was present.

Another U.S. Pat. No. 2,509,436, involved a packing for sealing between a shaft and a housing. However, although metallic reinforcing rings were in some instances provided, a space was left between the reinforcing ring and the shaft. This space permitted the possibility of elastomer creep or flow in high pressure situations.

Other patents known to applicants also relating to forming a seal between a shaft and a housing are U.S. Pat. Nos. 4,053,166; 4,201,392; 2,867,457 and 2,509,151. However, so far as is known, these references did not teach structure for protection against elastomer extrusion at high sealing pressures.

SUMMARY OF INVENTION

Briefly, the present invention provides a new and improved sealing member which forms a seal against pressure differentials between a body member and a movable member. The sealing member is adapted to be mounted in an annular or circular space in the body member adjacent a surface of the body member through which the movable member passes. The body member may be a housing, with the movable member a shaft in the housing, so that the sealing member forms a seal along its inner diameter. The body member may also be a piston block with the movable member a piston and the sealing member forming a seal along its inner diameter.

The sealing member of the present invention includes a lower anti-extrusion member, for insertion into the annular space, which has a contact surface to engage the surface of the body member. The sealing member also includes a cylindrical anti-extrusion member, extending upwardly from the lower anti-extrusion member, which has a contact surface adapted for engaging the movable member. A mass or body of sealing elastomer is mounted with the body member to form an initial seal once pressure is applied. When the pressure is increased, the sealing elastomer serves as a motion causing means, urging the cylindrical anti-extrusion member into contact with the movable member to prevent elastomer extrusion or creep.

DESCRIPTION OF PREFERRED EMBODIMENT

Figure 1:
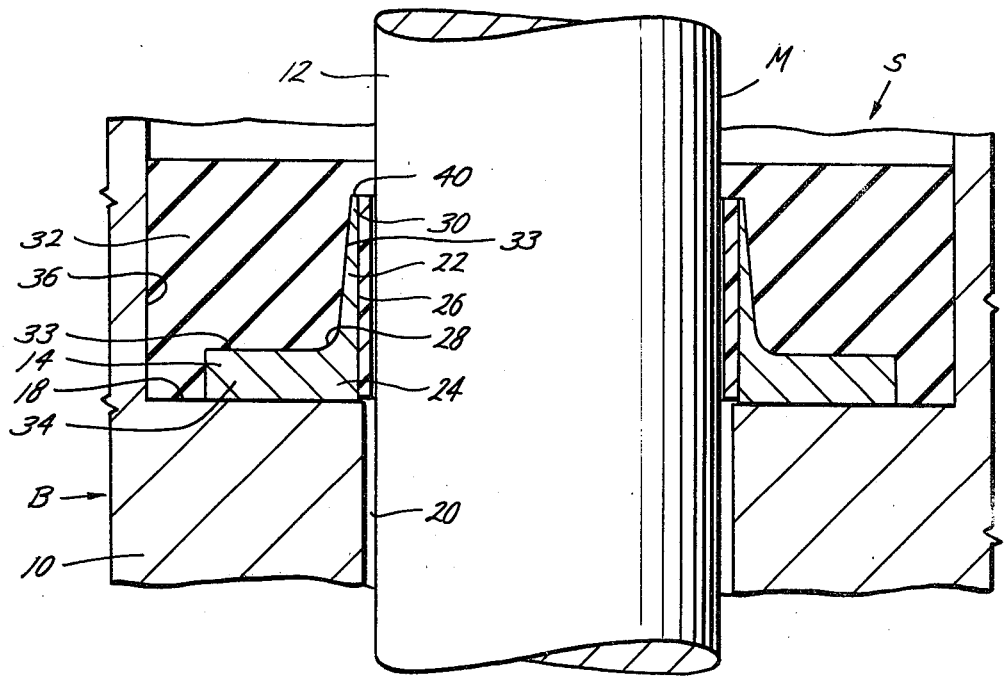
FIG. 1 is an elevation view, taken in cross-section of a sealing member according to the present invention.

In the drawings, the letter S designates generally a sealing member according to the present invention. The sealing member S forms a seal against the pressure differential across a gap or space present between a body member B and a moving member M. In a first embodiment, the body member B is a housing, such as a gate valve housing 10, with a movable member M being a shaft or stem 12 of the gate valve relatively movable with respect to the housing 10.

The sealing member S includes a lower shoulder or disk member portion 14 adapted to be inserted into an annular space between the housing 10 and shaft 12 to contact a shoulder surface 18 and seal an extrusion gap 20. The disk member 14 is preferably very large in size when compared to the extrusion gap 20, for example in the order of three or more times as thick as the width of the gap 20. In this manner, the gap 20 does not become the critical feature for seal design purposes.

The seal member S also includes a cylindrical anti-extrusion member portion 22 formed extending upwardly from an inner portion 24 of the shoulder member 14. The cylindrical anti-extrusion member 22 and the shoulder member 24 form a common co-planar inner surface 26 through which the shaft 12 passes. The cylindrical anti-extrusion member 22 and the shoulder member 14 join along a curved outer surface 28 above which the cylindrical member 22 extends. The anti-extrusion member 22 tapers in thickness along its extent from the surface 28 from a relatively thicker portion at the surface 28 to a relatively thinner upper portion 30, for reasons to be set forth.

The cylindrical portion 22 and the shoulder portion 14 of the seal member S are formed as an integral unit from a suitable material, usually a suitable strength stainless steel. A mass of sealing elastomer 32 of the sealing member S is mounted along a receiving shoulder surface 33 extending upwardly and outwardly from surface 28 along inner portions of the cylindrical anti-extrusion member 22 and the shoulder 14 to fill the space 16 between the housing 10 and shaft 12 not occupied by other portions of the sealing member S. Although shown in the drawings as having a flat upper surface, it should be understood that the sealing elastomer 32 may have any suitable shape of upper surface. Further, the sealing elastomer 32 may be reinforced with a suitable material, such as a fiber, for greater strength if desired. Also, for extremely high pressure situations, a deformable material such as a suitable synthetic resin could be used, if desired.

It is also to be noted that the sealing elastomer 32 fills a space between an outer end portion 34 of the shoulder 14 and a wall 36 of the housing 10. In this manner, no metal-to-metal seal is required between the shoulder 14 and the surface 18 of the housing 10. Thus, shoulder 14 serves primarily as a strengthing member and further to prevent extrusion of the elastomer 32. A coating or sleeve 40 may be formed, if desired, on the common inner surface 26 of the shoulder member 14 and anti-extrusion member 22. The sleeve 40 is formed of a material with a low coefficient of friction, such as a mixture of a phenolic resin and a fluorinated hydrocarbon. The sleeve 40 serves to lower friction between the sealing member S and the shaft 12 and also to protect the surface of the shaft 12 from galling due to contact with the surface 26. The thickness of the coating 40 varies according to the pressure conditions to be encountered. As higher pressures are encountered, the thickness of the coating 40 is reduced to protect against its shearing through the extrusion gap 18 at high pressures.

Figure 2:
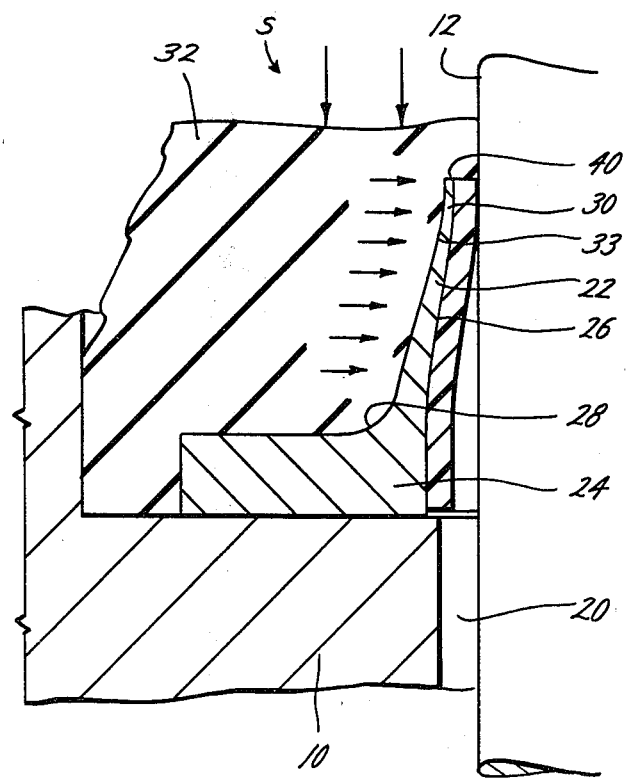
FIG. 2 is a schematic view of the anti-extrusion sealing function performed in the sealing member of FIG. 1.

In the operation of the present invention, the sealing elastomer mass 32 responds to initial application pressure and forms an initial seal between the housing 10 and shaft 12 along upper portions of the mass 32. As pressures increase, the sealing elastomer mass 32 begins to function as a motion causing member or piston. Due to the tapered shape of the cylindrical anti-extrusion member 22, as pressures increase, the anti-extrusion member 22 and coating 40 are cammed outwardly into contact with the shaft 12 (FIG. 2). Thus, as the sealing elastomer transmits pressure applied thereto, the contact surface 26 of the cylindrical anti-extrusion member 22 is moved into sealing engagement with the movable shaft 12, preventing movement of the sealing elastomer 32 into the anti-extrusion gap 18.

Figure 3:
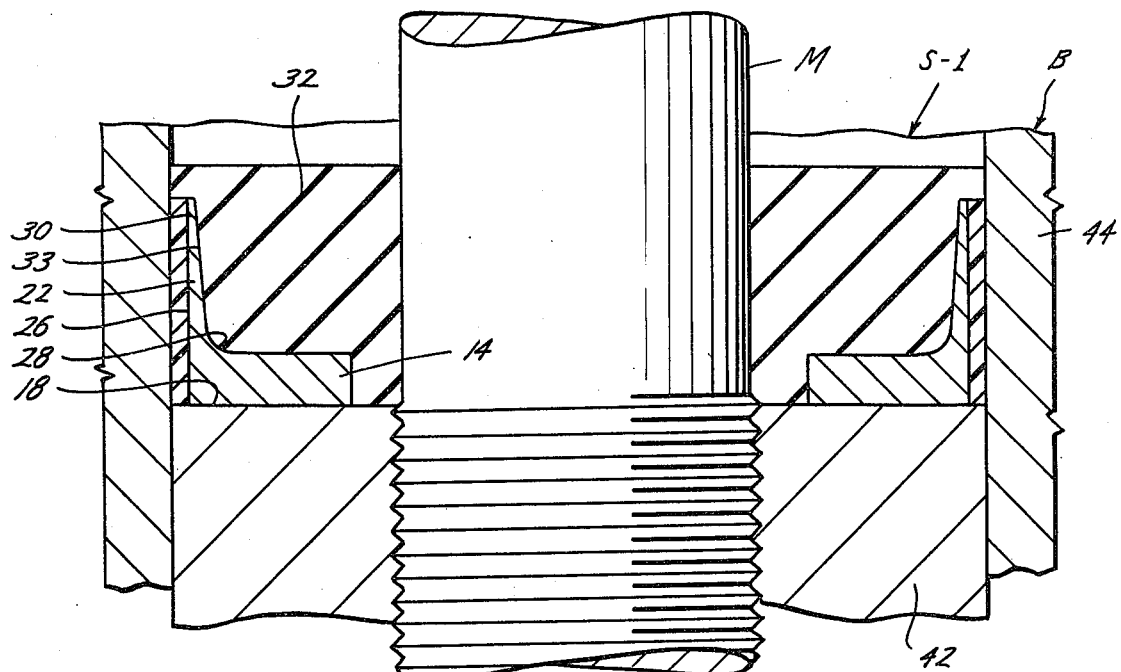
FIG. 3 is an elevation view, taken in cross-section of an alternative sealing member according to the present invention.
Figure 4:
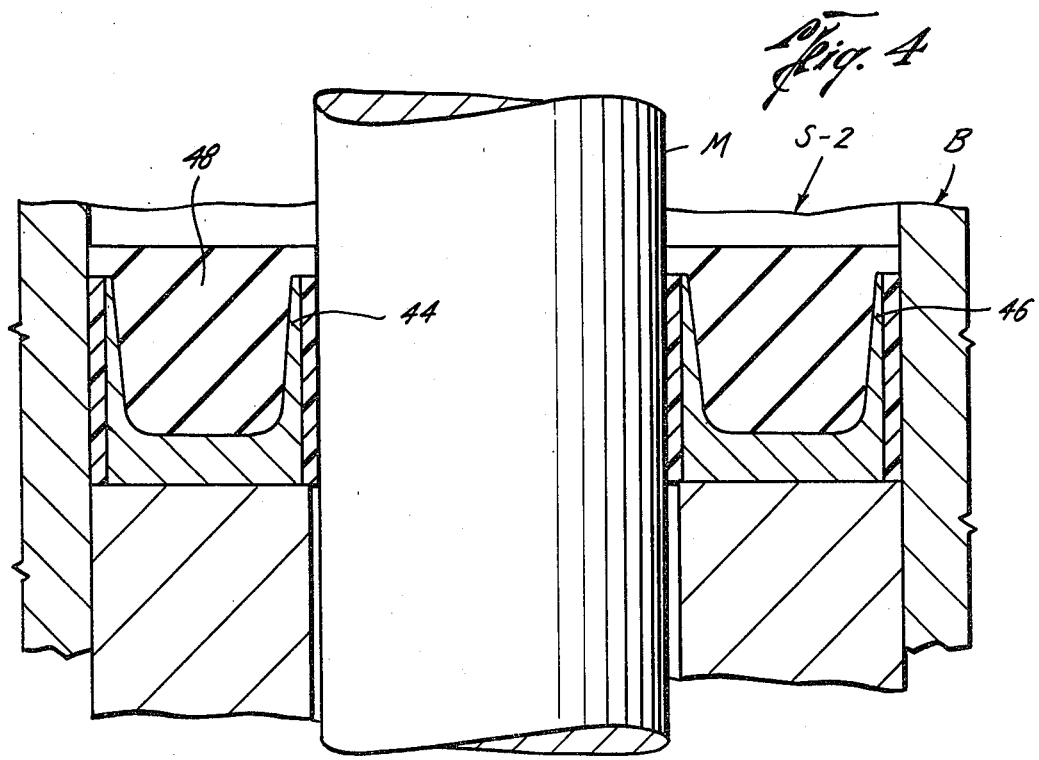
FIG. 4 is an elevation view, taken in cross-section, of a composite sealing member according to the present invention.

It should also be understood that the sealing member of the present invention may be used to seal between other types of body members, as well. For example, in an alternative embodiment (FIG. 3), a sealing member S-1 is adapted to seal along an outer diameter surface between a piston 42 and a chamber 44. Other than the location of the anti-extrusion member and shoulder member on an outer diameter of the sealing member S-1 (FIG. 3) rather than on an inner diameter in the sealing member S (FIG. 1) the configuration and function of the components thereof are identical. Accordingly, such structural members bear like reference numerals. Furthermore, a composite seal S-2 (FIG. 4) has an inner cylindrical anti-extrusion member 44 and an outer cylindrical anti-extrusion member 46 extending upwardly therefrom at opposite ends of the shoulder portion 14. The space between anti-extrusion members 44 and 46 is filled with a sealing elastomer mass 48. Depending upon whether sealing an extrusion prevention is needed along an inner diameter or an outer diameter of the sealing member S-2, the inner anti-extrusion member 44 or the outer anti-extrusion member 46 is cammed by the piston effect of the sealing elastomer 48 in response to fluid pressure to seal between the body member B and the movable member M. The sealing member S-2 thus functions as a composite sealing member permitting sealing along an inner diameter or an outer diameter as may be required depending upon the particular sealing needs.

The foregoing disclosure and description of the invention are illustrative and explanatory thereof, and various changes in the size, shape and materials, as well as in the details of the illustrated construction may be made without departing from the spirit of the invention.

We claim:

1. A sealing member for forming a seal against pressure differentials between a body member and a movable member mounted within the body member in a space formed in the body member adjacent a surface of the body member through which the movable member passes, said sealing member comprising:
   (a) a lower shoulder member having a contact surface for insertion into the annular space to engage the surface of the body member in the body member;
   (b) a cylindrical anti-extrusion member extending upwardly from said lower shoulder member and having a contact surface adapted for engaging the movable member;
   (c) said shoulder member and cylindrical anti-extrusion member having sealing elastomer means mounted therewith for transmitting pressure thereto to cause said contact surface of said cylindrical anti-extrusion member to move into sealing engagement with said movable member to prevent movement of said sealing elastomer into said space; and
   (d) a coating of low-friction material formed along said contact surface of said cylindrical anti-extrusion member to protect against galling of the movable member.

2. The sealing member of claim 1, wherein:
said shoulder member and said cylindrical anti-extrusion member are integrally formed with each other.

3. The sealing member of claim 1, wherein:
said shoulder member and said cylindrical anti-extrusion member form a receiving shoulder surface for mounting said sealing elastomer therewith.

4. The sealing member of claim 1, wherein:
said cylindrical anti-extrusion member tapers in decreasing thickness along the upward extent thereof from said lower shoulder member.

5. The sealing member of claim 1, wherein:
an extrusion gap is formed between the body member and the movable member, and wherein said shoulder member is substantially larger than the extrusion gap.

6. The sealing member of claim 1, wherein said shoulder member comprises an annular disk member.

7. The sealing member of claim 6, wherein said cylindrical anti-extrusion member is formed along an inner portion of said annular disk member extending therefrom.

8. The sealing member of claim 6, wherein said cylindrical anti-extrusion member is formed along an outer portion of said annular disk member extending therefrom.

9. The sealing member of claim 6, including said cylindrical anti-extrusion member having an inner cylindrical anti-extrusion member formed along an inner portion of said annular disk member extending therefrom and having a contact surface adapted to engage a movable member and an outer cylindrical anti-extrusion member formed along an outer portion of said annular disk member extending therefrom and having a contact surface adapted to engage a movable member, permitting said sealing member to be selectively used for inner or outer diameter sealing, each of said inner and outer cylindrical anti-extrusion members having a coating of low-friction material formed along said contact surface thereof to protect against galling of the movable member when engaged therewith.

10. The sealing member of claim 1, wherein:
said sealing elastomer means further comprises means for forming an initial seal between the body member and the movable member.

* * * * *